(12) United States Patent
Shake et al.

(10) Patent No.: US 10,207,475 B2
(45) Date of Patent: Feb. 19, 2019

(54) MAT-FACED BOARD

(71) Applicant: United States Gypsum Company, Chicago, IL (US)

(72) Inventors: Michael Patrick Shake, Johnsburg, IL (US); David R. Blackburn, Barrington, IL (US); Jeffrey Donelan, Highland Park, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 15/484,818

(22) Filed: Apr. 11, 2017

(65) Prior Publication Data

US 2017/0326839 A1 Nov. 16, 2017

Related U.S. Application Data

(60) Provisional application No. 62/336,406, filed on May 13, 2016.

(51) Int. Cl.
*B32B 9/00* (2006.01)
*E04C 2/34* (2006.01)
(Continued)

(52) U.S. Cl.
CPC .......... *B32B 9/005* (2013.01); *B28B 19/0092* (2013.01); *B32B 27/20* (2013.01);
(Continued)

(58) Field of Classification Search
CPC ... B32B 9/005; B32B 27/20; B32B 2262/101; B32B 2607/00; E04B 1/64; E04B 1/665;
(Continued)

(56) References Cited

U.S. PATENT DOCUMENTS 5,683,635 A 11/1997 Sucech et al.
6,409,823 B1 6/2002 Shake et al.
(Continued)

FOREIGN PATENT DOCUMENTS

WO WO-9908978 A1 * 2/1999 ............. C04B 22/16
WO WO 2001/49484 A1 7/2001
(Continued)

OTHER PUBLICATIONS

Burrows, "A Decade's Experience of Gypsum Board Weight Reduction in the U.S.", 14. Internationale Baustofftagung 1.0197-1.0207 (Weimar, Sep. 20-23, 2000).
(Continued)

*Primary Examiner* — David Sample
*Assistant Examiner* — Donald M Flores, Jr.
(74) *Attorney, Agent, or Firm* — Leydig, Voit & Mayer, Ltd.; Philip T. Petti; Pradip K. Sahu

(57) ABSTRACT

Disclosed is an improved facer mat for use as a cover sheet for gypsum board. Also disclosed are gypsum boards containing such mat facers on one or both major surfaces of the board (face and back sides when installed), a method of manufacturing such board, and a method of making the mat. The mat can comprise glass, thermoplastic, and/or thermoset fiber. In preferred embodiments, binder is included with the fiber. The mat has outer and inner surfaces. The mat comprises a first region adjacent to the outer surface defined along a horizontal plane of the mat, the first region having a first substantial thickness, and a second region adjacent to the inner surface defined along a horizontal plane of the mat, the second region having a second substantial thickness. The first region has (a) more hydrophilicity than the second region, (b) more wettability than the second region, and/or (c) less density than the second region.

20 Claims, 1 Drawing Sheet

(51) Int. Cl.

| | |
|---|---|
| *E04C 2/296* | (2006.01) |
| *B32B 27/20* | (2006.01) |
| *E04B 1/66* | (2006.01) |
| *B28B 1/30* | (2006.01) |
| *E04B 1/64* | (2006.01) |
| *B28B 11/24* | (2006.01) |
| *E04B 2/00* | (2006.01) |
| *E04C 2/28* | (2006.01) |
| *B32B 37/14* | (2006.01) |
| *E04C 2/04* | (2006.01) |
| *B28B 19/00* | (2006.01) |

(52) U.S. Cl.
CPC ............... *B32B 37/14* (2013.01); *E04C 2/04* (2013.01); *E04C 2/28* (2013.01); *E04C 2/296* (2013.01); *E04C 2/34* (2013.01); *E04C 2/44* (2013.01); *B32B 2262/101* (2013.01); *B32B 2607/00* (2013.01)

(58) Field of Classification Search
CPC . B28B 1/30; B28B 11/243; E04C 2/28; E04C 2/44; E04C 2/34; E04C 2/296; E04C 2/043; C04B 7/04
See application file for complete search history.

(56) References Cited

U.S. PATENT DOCUMENTS

| | | | |
|---|---|---|---|
| 6,409,824 | B1 | 6/2002 | Veeramasuneni et al. |
| 6,494,609 | B1 | 12/2002 | Wittbold et al. |
| 6,874,930 | B2 | 4/2005 | Wittbold et al. |
| 7,347,895 | B2 | 3/2008 | Dubey |
| 7,544,242 | B2 | 6/2009 | Liu et al. |
| 7,637,996 | B2 | 12/2009 | Blackburn et al. |
| 7,767,019 | B2 | 8/2010 | Liu et al. |
| 2002/0151240 | A1* | 10/2002 | Smith ............... A61M 5/14212 442/327 |
| 2006/0068186 | A1* | 3/2006 | Leclercq ................. B32B 5/022 428/294.7 |
| 2006/0278127 | A1 | 12/2006 | Liu et al. |
| 2006/0278128 | A1 | 12/2006 | Liu et al. |
| 2006/0278132 | A1 | 12/2006 | Yu et al. |
| 2006/0280898 | A1 | 12/2006 | Lettkeman et al. |
| 2006/0280899 | A1 | 12/2006 | Liu et al. |
| 2006/0281837 | A1 | 12/2006 | Lettkeman et al. |
| 2007/0044687 | A1 | 3/2007 | Blackburn et al. |
| 2007/0141931 | A1* | 6/2007 | Nandi ..................... B32B 5/26 442/59 |
| 2008/0000392 | A1 | 1/2008 | Blackburn et al. |
| 2008/0148997 | A1 | 6/2008 | Blackburn et al. |
| 2008/0190062 | A1* | 8/2008 | Engbrecht ............... B32B 13/14 52/408 |
| 2009/0029141 | A1 | 1/2009 | Shake et al. |
| 2010/0143682 | A1* | 6/2010 | Shake .................... B32B 13/14 428/218 |
| 2010/0247937 | A1 | 9/2010 | Liu et al. |
| 2011/0030453 | A1 | 2/2011 | Shake et al. |
| 2011/0054053 | A1 | 3/2011 | Lee et al. |
| 2011/0214491 | A1 | 9/2011 | Weinberger et al. |
| 2012/0167805 | A1 | 7/2012 | Wittbold et al. |
| 2012/0168527 | A1 | 7/2012 | Li et al. |
| 2012/0170403 | A1 | 7/2012 | Li et al. |
| 2012/0172468 | A1 | 7/2012 | Blackburn et al. |
| 2014/0261954 | A1 | 9/2014 | Dubey et al. |
| 2014/0272402 | A1 | 9/2014 | Dubey et al. |
| 2014/0272404 | A1 | 9/2014 | Shake et al. |
| 2015/0291844 | A1 | 10/2015 | Blackburn et al. |
| 2016/0069070 | A1 | 3/2016 | Li |
| 2016/0264461 | A1 | 9/2016 | Peng et al. |
| 2016/0364852 | A1 | 12/2016 | Omodt et al. |
| 2017/0197379 | A1 | 7/2017 | Teng et al. |

FOREIGN PATENT DOCUMENTS

| | | |
|---|---|---|
| WO | WO 2006/138273 A2 | 12/2006 |
| WO | WO 2006/138277 A2 | 12/2006 |
| WO | WO 2007/027530 A2 | 3/2007 |

OTHER PUBLICATIONS

Peterson, Kurt, "Engineered Gypsum Panels, the Development and Application of Densified Zones at the Paper/Core Interface of Gypsum Panels", Proceedings of Gypsum 2000, 6th International Conference on Natural and Synthetic Gypsum, Toronto, Canada, pp. 9-1-9-16 (May 2000).

European Patent Office, International Search Report and the Written Opinion in International Application PCT/US2017/031181 (dated Sep. 14, 2017).

* cited by examiner

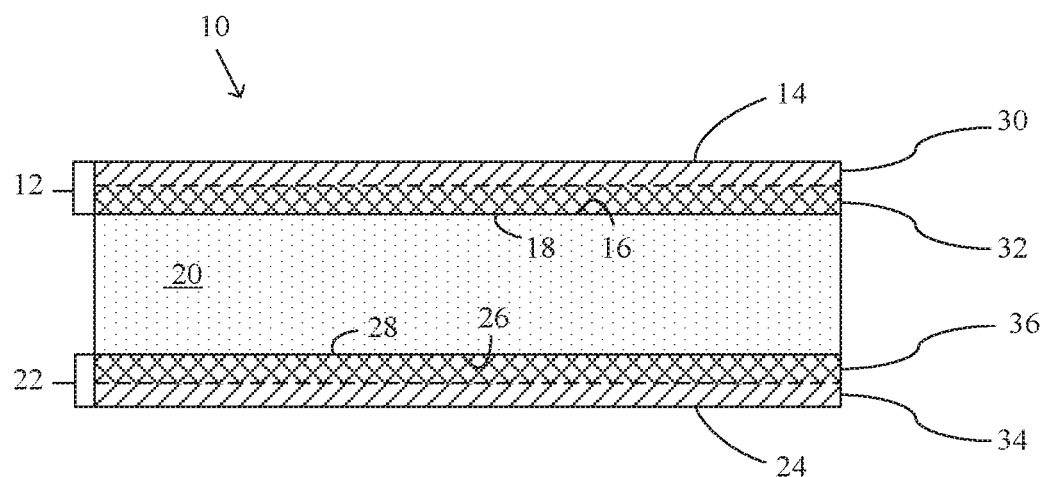

MAT-FACED BOARD

CROSS-REFERENCE TO RELATED APPLICATIONS

This patent application claims priority to U.S. Patent Application No. 62/336,406, filed May 13, 2016, as well as to co-pending U.S. patent application Ser. No. 15/484,873, entitled "Method for Preparing Mat-Faced Board," filed Apr. 11, 2017. Both of the prior applications are incorporated by reference in their entireties.

BACKGROUND

Gypsum wallboard having a gypsum-based core reinforced on the outer major surfaces with a facing material or scrim is well-known in the art. The facing material is often paper for typically dry environments, e.g., for indoor drywall products. For some applications, however, a glass or polymer-based mat is used in products that may be exposed to high moisture conditions. For example, such board is useful in exterior sheathing products. The glass-mat gypsum board sheathing can be applied to outer studs, joists, or rafters of a home or commercial building to strengthen the structure and provide fire resistance and a degree of water resistance. The sheathing provides a base for exterior cladding (e.g., bricks, siding, stone, etc.) to be applied, with an additional moisture and vapor barrier substrate optionally applied there between.

Glass-mat gypsum board can also be utilized in indoor applications where the board may be exposed to significant moisture. For example, glass-mat faced board can be used in a variety of indoor locations, such as in sink or tub enclosures, backsplashes, etc. The glass-mat faced board provides a base for ceramic tile or the like to be applied, e.g., using mortar or mastic to secure the tile to the base. The glass mat provides a degree of water resistance and mold resistance over time in case water penetrates through the set mortar or mastic, e.g. through cracks in the tile or grout.

The manufacturing process of mat-faced gypsum board typically involves depositing cementitious slurry (e.g., a mixture containing stucco and water, where stucco refers to calcined gypsum, typically comprised primarily of calcium sulfate hemihydrate and/or calcium sulfate anhydrite) over a first mat facing material and covering the wet slurry with a second mat facing material, usually of the same type, such that the cementitious slurry is sandwiched between the two mat facing materials. The cementitious slurry is allowed to harden (e.g., forming an interlocking matrix of calcium sulfate dihydrate, referred to as set gypsum) to produce a solid article prior to final drying in a kiln.

The manufacturing process of mat-faced gypsum board, thus, often requires the facing material to be sufficiently permeable that excess water can be removed from the cementitious slurry in the drying process. For example, non-woven fiberglass mat is often used as the facing material, in which the space between the fibers provides permeability. The permeability of the fibrous mat facing material, if not treated, could reduce the water-resistance of the cementitious article because it allows water to penetrate the mat and contact the cementitious core during use. In order to alleviate this problem, exterior coatings of water resistant material are sometimes applied.

Current methods for applying the coating have been found to be inefficient. Generally, the mats are designed to be hydrophobic and repel water. A drawback is that it becomes a challenge to apply wet coatings to such hydrophobic surfaces where the wettability is poor. Because of the hydrophobic nature of the mat, during application, it becomes difficult for the wet coating to sufficiently wet or flow across the mat surface, which can lead to coating defects and defective board that can result in lost production of culled board. If a wetting aid is included to reduce the surface tension of the wet coating material, a high volume of coating is consumed by seepage through the mat, thereby resulting in significant waste.

Thus, there remains a desire for new water resistant cementitious articles, as well as methods of preparing such articles.

BRIEF SUMMARY

In one aspect, the disclosure provides a facer mat for use as a cover sheet with board products (e.g., gypsum or cement board). In some embodiments, the mat comprises an outer surface and an inner surface. The mat also includes a first region adjacent to the outer surface defined along a horizontal plane of the mat, the first region having a first substantial thickness. The mat also includes a second region adjacent to the inner surface defined along a horizontal plane of the mat, the second region having a second substantial thickness. The first region is more hydrophilic than the second region.

In another aspect, the disclosure provides another mat for use as a cover sheet with gypsum board, the mat comprising an outer surface and an inner surface. The mat also includes a first region adjacent to the outer surface defined along a horizontal plane of the mat, the first region having a first substantial thickness. The mat also includes a second region adjacent to the inner surface defined along a horizontal plane of the mat, the second region having a second substantial thickness. The first region is more wettable than the second region.

In another aspect, the disclosure provides another mat for use as a cover sheet for gypsum board. The mat comprises an outer surface and an inner surface. The mat also includes a first region adjacent to the outer surface defined along a horizontal plane of the mat, the first region having a first substantial thickness. The mat also includes a second region adjacent to the inner surface defined along a horizontal plane of the mat, the second region having a second substantial thickness. The first region is less dense than the second region.

In another aspect, the disclosure provides gypsum board comprising a gypsum core disposed between two cover sheets. The core has a face surface and a back surface. At least one cover sheet is a mat (e.g., containing glass fiber). A face mat faces a face surface of the core, and a back mat faces a back surface of the core. The gypsum core comprises set gypsum, e.g., a crystalline matrix of set gypsum. The face mat, and optionally the back mat, has an outer surface and an inner surface. The face mat, and optionally the back mat, comprises a first region adjacent to the outer surface of the mat defined along a horizontal plane of the mat, the first region having a first substantial thickness. The face mat, and optionally the back mat, also comprises a second region adjacent to the inner surface of the mat defined along a horizontal plane of the mat, the second region having a second substantial thickness. The first region is more hydrophilic than the second region.

In another aspect, the disclosure provides another gypsum board comprising a gypsum core disposed between two cover sheets. The gypsum core generally comprises set gypsum, e.g., a crystalline matrix of set gypsum in preferred embodiments. The core has a face surface and a back surface. One or both of the cover sheets is in the form of a mat (e.g., containing glass fiber). A face mat faces a face surface of the core, and, optionally, a back mat faces a back surface of the core. The face mat, and optionally the back mat, has an outer surface and an inner surface. The face mat, and optionally the back mat, comprises a first region adjacent to the outer surface of the mat defined along a horizontal plane of the mat, the first region having a first substantial thickness (relative to the entire thickness of the mat). The face mat, and optionally the back mat, also comprises a second region adjacent to the inner surface of the mat defined along a horizontal plane of the mat, the second region having a second substantial thickness. The first region is more wettable than the second region.

In another aspect, the disclosure provides another gypsum board comprising a gypsum core disposed between two cover sheets. The gypsum core generally comprises set gypsum, e.g., a crystalline matrix of set gypsum in preferred embodiments. The core has a face surface and a back surface. One or both of the cover sheets is in the form of a mat (e.g., containing glass fiber). A face mat faces a face surface of the core, and, optionally, a back mat faces a back surface of the core. The face mat, and optionally the back mat, has an outer surface and an inner surface. The face mat, and optionally the back mat, comprises a first region adjacent to the outer surface of the mat defined along a horizontal plane of the mat, the first region having a first substantial thickness (relative to the entire thickness of the mat). The face mat, and optionally the back mat, also comprises a second region adjacent to the inner surface of the mat defined along a horizontal plane of the mat, the second region having a second substantial thickness. The first region is less dense than the second region.

In another aspect, the disclosure provides a method of manufacturing gypsum board. The method can be in the form of making composite gypsum board (i.e., gypsum core with a face mat adjacent to a face surface of the core, and optionally a cover sheet adjacent to a back surface of the core). The method generally comprises mixing at least water, stucco, and optionally one or more additives to form a slurry (e.g., in a pin or pin-less mixer). The slurry is applied to form a board core in a direct or indirect bonding relation to a face mat. The board core has a face surface and a back surface, wherein the face surface faces the face mat. A back mat is applied to the core slurry to form a board precursor. The board precursor is dried to form the board. At least one mat comprises a first region adjacent to the outer surface defined along a horizontal plane of the mat, the first region having a first substantial thickness, and a second region adjacent to the inner surface defined along a horizontal plane of the mat, the second region having a second substantial thickness. The first region is more hydrophilic than the second region.

In another aspect, another method of making composite gypsum board is provided. The method comprises mixing at least water, stucco, and optionally one or more additives to form slurry. The slurry is applied to form a board core in a direct or indirect bonding relation to a face mat. The board core has a face surface and a back surface, wherein the face surface faces the face mat. A back mat is applied to the core slurry to form a board precursor. The board precursor is dried to form the board. At least one mat comprises a first region adjacent to the outer surface defined along a horizontal plane of the mat, the first region having a first substantial thickness, and a second region adjacent to the inner surface defined along a horizontal plane of the mat, the second region having a second substantial thickness. The first region is less dense than the second region.

In another aspect, the disclosure provides another method of making composite gypsum board. The method comprises mixing at least water, stucco, and optionally one or more additives to form slurry. The slurry is applied to form a board core in a direct or indirect bonding relation to a face mat. The board core has a face surface and a back surface, wherein the face surface faces the face mat. A back mat is applied to the core slurry to form a board precursor. The board precursor is dried to form the board. At least one mat comprises a first region adjacent to the outer surface defined along a horizontal plane of the mat, the first region having a first substantial thickness, and a second region adjacent to the inner surface defined along a horizontal plane of the mat, the second region having a second substantial thickness. The first region is more hydrophilic than the second region.

In another aspect, the disclosure provides a method of making a mat for use as a cover sheet in board products. The method comprises introducing fibers to wet felting processing or the like to form a mat having an outer surface and an inner surface. The fibers can be in the form of, for example, glass, thermoplastic, or thermoset fiber. The mat is prepared to have a first region adjacent to the outer surface defined along a horizontal plane of the mat, the first region having a first thickness. The mat is prepared to have a second region adjacent to the inner surface defined along a horizontal plane of the mat, the second region having a second thickness. The mat is prepared such that the first region is more hydrophilic than the second region.

In another aspect, another method of preparing a mat for use as a cover sheet with board is provided. The method comprises introducing fibers to wet felting processing or the like to form a mat having an outer surface and an inner surface. The fibers can be in the form of, for example, glass, thermoplastic, or thermoset fiber. The mat is prepared to have a first region adjacent to the outer surface defined along a horizontal plane of the mat, the first region having a first thickness. The mat is also prepared to also include a second region adjacent to the inner surface defined along a horizontal plane of the mat, the second region having a second thickness. The first region is prepared to be more wettable than the second region.

In another aspect, the disclosure provides another method of preparing a mat for use as a cover sheet with board. The method comprises introducing fibers to wet felting processing or the like to form a mat having outer and inner surfaces. The fibers can be in the form of, for example, glass, thermoplastic, or thermoset fiber. The mat is prepared to have a first region adjacent to the outer surface defined along a horizontal plane of the mat, the first region having a first thickness. The mat is also prepared to have a second region adjacent to the inner surface defined along a horizontal plane of the mat, the second region having a second thickness. The first region is prepared to be less dense than the second region.

BRIEF DESCRIPTION OF THE DRAWING

FIG. 1 schematically illustrates a cross-sectional view of an embodiment of a cementitious board with a core sandwiched between two mats (not to scale).

DETAILED DESCRIPTION

Embodiments of the disclosure provide an improved facer mat, as well as gypsum board containing such mat facers on one or both major surfaces of the board (face and back sides when installed), a method of manufacturing such board, and a method of making the mat. In particular, the facer according to embodiments of the disclosure more preferentially receives coatings, e.g., in a continuous manufacturing method. The improved glass mat of the disclosure accepts coatings readily and results in a more robust and efficient manufacturing process. Coatings can be applied with good flow and coverage on the mat, with good uniformity and less coating defects. During production, less board is required to be culled, such that board production yields can improve. In addition, the mat facer of the disclosure allows for less loss of coating material by seepage into and/or through the mat. As such, use of the facer mat in accordance with preferred embodiments results in a more efficient manufacturing process. In some embodiments, the disclosure reduces or avoids the need for any wetting aids in the coating that is applied.

The mat, in accordance with embodiments of the disclosure, includes an outer surface and an inner surface. In a composite board product, a gypsum core is sandwiched between two mat facers. One mat facer is referred to herein as the face mat, and the other facer is referred to as the back mat.

One embodiment of a board orientation is set forth in FIG. 1. A board 10 includes a face mat 12 having an outer surface 14 which is generally facing exterior cladding of a building structure (with an optional moisture and/or vapor barrier substrate disposed there between), while an inner surface 16 of the mat 12 faces, and optionally directly or indirectly affixes to, to a face surface 18 of a gypsum core 20. On the back side of the board 10, a back mat 22 has an outer surface 24 generally facing the studs, rafters, or joists of a structure. The studs, rafters, or joists can be made of any suitable material, including a wood material or metal (e.g., steel). An inner surface 26 of the back mat 22 faces, and optionally directly or indirectly affixes to, a back surface 28 of the gypsum core 20.

FIG. 1 shows mats 12 and 22 having different regions exhibiting different properties or densities. It will be understood that only one of the mats can have the regions if desired. As seen in FIG. 1, the face mat 12 includes a first region 30, which is adjacent to the outer surface 14 of the mat 12, and a second region 32, which is adjacent to the inner surface 16 of the mat 12. As seen in FIG. 1, the back mat 22 includes a third region 34, which is adjacent to the outer surface of the mat 24, and a fourth region, 36 which is adjacent to the inner surface of the mat 26.

In some embodiments, gypsum board in accordance with embodiments of the disclosure includes mats disposed on both the face side and the back side of the board. In other embodiments, only the face mat is included in accordance with embodiments of the disclosure, while the back side of the board can have a conventional mat or paper facing material, or the back mat or paper can be absent (i.e., board is prepared without back cover sheet). The board can be used in indoor or outdoor applications where fluid (e.g., water or vapor) resistance is desired, e.g., for exterior sheathing, or the base for backsplashes, sink, shower, or bathtub enclosures, or other indoor surfaces in a high moisture area, on which a tile (e.g., ceramic) or other decorative surface is applied. In some embodiments, a back mat is excluded.

A suitable coating can be applied to the mat. Preferably, the mat allows for the coating to penetrate into a portion, or certain level of thickness or volume of the mat, while discouraging the coating from penetrating all the way through the complete thickness of the mat and into the gypsum core. As such, the coating applied to a wettable surface can spread substantially uniformly to form a thin coating on the outer surface of the mat that provides desired properties (e.g., one or more of mold resistance, water resistance, and fire resistance, etc.) in use. In accordance with preferred embodiments, this can be achieved by providing a mat with different regions exhibiting different properties or densities as described herein.

In some embodiments, the first region is more hydrophilic than the second region, on a comparative basis. In some embodiments, the first region has a lower comparative density than the second region. In some embodiments, the first region of the mat is more wettable than the second region. In some embodiments, the first region of the mat is more hydrophilic, wettable, and less dense than the second region. In this regard, the first region's hydrophilicity allows for good, even, and substantially uniform application of a desired coating to the outer surface of the mat, while the second region's hydrophobicity avoids the aqueous gypsum slurry from undesirably penetrating the mat to a high degree. Loose fibers in the mat bond to the slurry without excessive penetration of the slurry into the mat on the inner surface of the mat.

In some embodiments, the second region is denser and/or thicker than the first region. In preferred embodiments, fibers in the mat can form a dense arrangement, creating a tortuous path for slurry to travel, thereby reducing the opportunity for stucco slurry to penetrate too deeply into the core interfacing the back mat, as desired. To the contrary, the first region in some embodiments is less dense than the second region, to allow for a less tortuous path for the coating being applied to the inner surface of the mat to penetrate the mat, while maintaining sufficient integrity (e.g., the first region is desirably not friable) under manufacturing or use conditions. Thus, the coating is able to penetrate and form a uniform layer that provides desired properties, including resistance to fluid, on the face side.

For example, the first region can have a basis weight of about 24 lb/MSF or less on a per area basis, while the second region can have a basis weight of about 29 lb/MSF or more. In some embodiments, the second region has a basis weight that is at least 10% higher than the first region, e.g., at least about 15% higher, at least about 20% higher, at least about 25% higher, at least about 30% higher, at least about 35% higher, at least about 40% higher, at least about 45% higher, or at least about 50% higher, or even higher. For example, the second region can have a basis weight that is from about 20% to about 50% higher than the basis weight of the first region, e.g., from about 20% to about 45% higher, from about 20% to about 40% higher, from about 20% to about 35% higher, from about 20% to about 30% higher, from about 20% to about 25% higher, from about 30% to about 50% higher, from about 30% to about 45% higher, from about 30% to about 40% higher, from about 35% to about 50% higher, from about 35% to about 45% higher, or from about 35% to about 40% higher.

The first and second regions can be defined as being parallel to a horizontal plane of the mat and having certain thickness. Each of the first and second regions can have any suitable thickness. Preferably, each of the first and second regions has a substantial thickness. The mat can have any suitable total thickness, such as, for example, from about 0.015 inch to about 0.05 inch, e.g., from about 0.015 inch to about 0.045 inch, from about 0.015 inch to about 0.04 inch, from about 0.015 inch to about 0.035 inch, from about 0.015 inch to about 0.03 inch, from about 0.02 inch to about 0.05 inch, from about 0.02 inch to about 0.045 inch, from about 0.02 inch to about 0.04 inch, from about 0.02 inch to about 0.03 inch, from about 0.025 inch to about 0.05 inch, from about 0.025 inch to about 0.045 inch, from about 0.025 inch to about 0.04 inch, from about 0.025 inch to about 0.035 inch, from about 0.03 inch to about 0.05 inch, from about 0.03 inch to about 0.045 inch, from about 0.03 inch to about 0.04 inch, or from about 0.03 inch to about 0.035 inch. In some embodiments, the mat can have a nominal thickness of about 0.03 inch or about 0.045 inch. In some embodiments, the first and second regions each contribute about 50% of the total thickness of the mat. However, if desired, the total thickness of each region can vary.

For example, in some embodiments, the first region can contribute about 80% or less of the total thickness, such as, about 75%, about 70%, about 60%, about 50%, about 40%, about 30% or about 20% of the total thickness of the mat, e.g., from about 20% to about 80% of the total thickness, from about 20% to about 75%, from about 20% to about 75%, from about 20% to about 70%, from about 20% to about 60%, from about 20% to about 50%, from about 20% to about 40%, from about 20% to about 30%, from about 30% to about 80%, from about 30% to about 70%, from about 30% to about 60%, from about 30% to about 50%, from about 30% to about 40%, from about 40% to about 80%, from about 40% to about 75%, from about 40% to about 70%, from about 40% to about 60%, from about 40% to about 50%, from about 50% to about 80%, from about 50% to about 75%, from about 50% to about 70%, from about 50% to about 70%, from about 50% to about 60%, from about 60% to about 80%, from about 60% to about 75%, from about 60% to about 70%, from about 70% to about 80%, or from about 70% to about 75% of the total thickness of the mat.

In some embodiments, the second region can contribute about 80% or less of the total thickness, such as, about 75%, about 70%, about 60%, about 50%, about 40%, about 30% or about 20% of the total thickness of the mat, e.g., from about 20% to about 80% of the total thickness, from about 20% to about 75%, from about 20% to about 75%, from about 20% to about 70%, from about 20% to about 60%, from about 20% to about 50%, from about 20% to about 40%, from about 20% to about 30%, from about 30% to about 80%, from about 30% to about 70%, from about 30% to about 60%, from about 30% to about 50%, from about 30% to about 40%, from about 40% to about 80%, from about 40% to about 75%, from about 40% to about 70%, from about 40% to about 60%, from about 40% to about 50%, from about 50% to about 80%, from about 50% to about 75%, from about 50% to about 70%, from about 50% to about 60%, from about 60% to about 80%, from about 60% to about 75%, from about 60% to about 70%, from about 70% to about 80%, or from about 70% to about 75% of the total thickness of the mat.

In some embodiments, the second region is thicker than the first region is, e.g., at least about 10% thicker, at least about 15% thicker, at least about 20% thicker, at least about 25% thicker, at least about 30% thicker. For example, in some embodiments, the second region from about 10% to about 100% thicker than the first region, e.g., from about 10% to about 80% thicker, from about 10% to about 60% thicker, from about 10% to about 50% thicker, from about 10% to about 40% thicker, from about 10% to about 30% thicker, from about 20% to about 100% thicker, from about 20% to about 80% thicker, from about 20% to about 60% thicker, from about 20% to about 40% thicker, from about 20% to about 30% thicker, from about 30% to about 100% thicker, from about 30% to about 80% thicker, from about 30% to about 60% thicker, from about 30% to about 50% thicker, from about 30% to about 40% thicker, from about 40% to about 100% thicker, from about 40% to about 80% thicker, from about 40% to about 60% thicker, from about 40% to about 50% thicker, from about 50% to about 100% thicker, from about 50% to about 80% thicker, from about 50% to about 60% thicker, or from about 60% to about 100% thicker.

The coating is generally applied to the outer surface of the mat. In preferred embodiments, the coating when dried penetrates from about 20% to about 80% of the total mat thickness. For example, the coating when dried penetrates from about 20% to about 75% of the mat thickness, e.g., from about 20% to about 70%, from about 20% to about 60%, from about 20% to about 50%, from about 20% to about 40%, from about 20% to about 30%, from about 30% to about 80%, from about 30% to about 70%, from about 30% to about 60%, from about 30% to about 50%, from about 30% to about 40%, from about 40% to about 80%, from about 40% to about 75%, from about 40% to about 70%, from about 40% to about 60%, from about 40% to about 50%, from about 50% to about 80%, from about 50% to about 75%, from about 50% to about 70%, from about 50% to about 60%, from about 60% to about 80%, from about 60% to about 75%, from about 60% to about 70%, from about 70% to about 80%, or from about 70% to about 75% of the total thickness of the mat In some embodiments, the first region is more wettable than the second region. Wettability indicates the ability of a liquid to spread on a surface. A small contact angle results when the liquid spreads effectively for more wettable surfaces. Conversely, for less wettable surfaces, a larger contact angle is observed, compared with the first region. In some embodiments, the second region has a high contact angle (e.g., above about 90°) and lower wettability as liquid minimizes contact with the surface and forms beads on the surface. Preferably, the first region tends to have a low contact angle upon wetting with water. In some embodiments, the first region has a higher surface energy than the second region.

For example, in some embodiments, the first region can have a contact angle of about 90° or less, e.g., a contact angle of about 80° or less, about 70° or less, about 60° or less, about 50° or less, about 40° or less, about 30° or less, or about 20° or less. In some embodiments, the first region can exhibit a contact angle of from about 0° to about 60°, e.g., from about 0° to about 55°, from about 0° to about 50°, from about 0° to about 45°, from about 0° to about 40°, from about 0° to about 30°, from about 0° to about 20°, from about 0° to about 10°, from about 10° to about 60°, from about 10° to about 55°, from about 10° to about 50°, from about 10° to about 45°, from about 10° to about 40°, from about 10° to about 30°, from about 10° to less than about 20°, from about 20° to about 60°, from about 20° to about 55°, from about 20° to about 50°, from about 20° to about 45°, from about 20° to about 40°, from about 20° to about 35°, from about 20° to about 30°, from about 30° to about 60°, from about 30° to about 55°, from about 30° to about 50°, from about 30° to about 45°, from about 30° to about 40°, from about 40° to about 60°, from about 40° to about 55°, from about 40° to about 50°, or from about 50° to about 60°. In some embodiments, the first region can be both hydrophilic and wettable.

Preferably, there is a differential in the magnitude of the contact angle between the first region and the second region. The second region generally exhibits a higher contact angle, but the second region need not be hydrophobic, although in some embodiments it can be. In some embodiments, the second region can have a contact angle of about 60° or greater. For example, the second region can have a contact angle of from about 60° to about 180°, e.g., from about from about 60° to about 150°, from about 60° to about 120°, from about 60° to about 100°, from about 60° to about 90°, from about 60° to about 80°, from about 60° to about 70°, from about 70° to about 180°, from about 70° to about 150°, from about 70° to about 120°, from about 70° to about 100°, from about 70° to about 90°, from about 70° to about 80°, from about 80° to about 180°, from about 80° to about 150°, from about 80° to about 120°, from about 80° to about 100°, from about 80° to about 90°. In some embodiments, the second region is hydrophobic and has a contact angle over 90°. For example, in some embodiments, the second region has a contact angle of from about 90° to about 180°, from about 90° to about 170°, from about 90° to about 160°, from about 90° to about 150°, from about 90° to about 140°, from about 90° to about 130°, from about 90° to about 120°, from about 90° to about 110°, from about 90° to about 100°, from about 100° to about 180°, from about 100° to about 160°, from about 100° to about 140°, from about 100° to about 120°, from about 100° to about 110°, from about 120° to about 180°, from about 120° to about 150°, from about 120° to about 130°, from about 130° to about 180°, from about 130° to about 160°, from about 130° to about 150°, from about 140° to about 180°, from about 140° to about 160°, from about 150° to about 180°, from about 150° to about 160°, from about 160° to about 180°, or from about 160° to about 170°. In some embodiments, the contact angle of the second region is substantially larger than the contact angle of the first region (e.g., about 20% or larger, such as about 30% larger, about 40% larger, about 50% larger, or more).

These differentials in properties in the different regions can be accomplished in a variety of ways. For example, in some embodiments, the mat can be in the form of a multi-layer structure (e.g., a bi-layer structure). In some embodiments, the mat can exhibit a gradient to form the two distinct regions of the mat (e.g., in a single layer). Optionally, in some embodiments, there can be a transition zone in between the first region and the second region, e.g., where the transition zone has contribution of properties from both regions, with, for example, a less hydrophilic nature than the first region and/or a higher density than the first region, but with more of a hydrophilic nature than the second region and/or a lower density than the second region. In some embodiments, the transition zone is a by-product of the manufacturing of the process.

In some embodiments, the porous fibrous mat is a glass fiber mat formed from chopped or continuous glass fibers having an average diameter of about 5 to about 20 microns, such as about 10 to about 20 microns or even about 11 to about 16 microns and a basis weight of about 20 lbs/1000 ft² or greater. The porous fibrous mat also can comprise microfibers having a diameter, for instance, of about 2-8 microns or 4-6 microns. The fibrous mat also can comprise fibers having different diameters. For example, the glass fiber mat can comprise about 70 to about 90 percent glass fibers having a diameter of about 10 to about 20 microns and about 10 to about 30 percent glass fibers having a smaller diameter of about 2 to about 15 microns with a basis weight of about 20 lbs/1000 ft² or greater. In another embodiment, the fibrous mat can comprise about 70 to about 90 percent glass fibers having a diameter of about 14 microns or greater, or 15 microns or greater (e.g., about 14 to about 16 microns) and about 10 to about 30 percent glass microfibers having a diameter of about 4 to about 6 microns with a basis weight of about 20 lbs/1000 ft² or greater. The fibers can have any suitable length. For instance, the microfibers can be of varying lengths. The other fibers typically will have a length of about 1-inch or less (e.g., about ⅜-inch to i-inch, or about ½-inch to about ¾-inch). By way of further illustration, one such glass fiber mat is formed from about 80 percent fibers having about 16 micron diameter (about ½ inch length) and about 20 percent of the fibers having about 11 micron diameter (about inch length) with a basis weight of about 22 lbs/1000 ft². Another suitable glass fiber mat is formed from about 90 percent fibers having about 16 micron diameter (¾ inch length) and about 10 percent of the fibers having about 4 to about 6 micron diameter (various lengths) with a basis weight of about 22 lbs/1000 ft.

The mat comprises one or more binders in some embodiments. The mat is preferably formed using a thermosetting resin to bind the glass fibers into a non-woven web. By one approach, the thermosetting resin may be an acrylic resin, such as a blend of melamine formaldehyde and other acrylic resins. The mat can comprise any suitable amount of binder, such as about 5-40% by weight, about 10-30% by weight, or about 20-30% by weight. The above described fibrous mat is but one example of a suitable mat that can be employed herein. It will be appreciated that other porous and fibrous mats having various compositions may also be employed using the methods described herein.

For example, in some embodiments, the first region contains binder (optionally with additive) that contributes or imparts hydrophilicity to the first region. In some embodiments, the second region contains binder with additive (e.g., a stearate compound) that contributes hydrophobicity to the second region. Increasing hydrophobicity can be achieved with increasing hydrocarbon chain lengths in, for example, one or more component of the binder composition. Increasing hydrophilicity can be achieved, for example, by selecting one or more binder component with reduced hydrocarbon chain length, and/or by making modifications to one or more components of the binder composition, such as by addition of hydroxyls in the chemical structure thereof. In some embodiments, the first region contains a first binder that contributes or imparts hydrophilicity to the first region, and the second region contains a second binder that contributes or imparts hydrophobicity to the second region.

The mat can be used with any suitable coating. In some embodiments, a coating of hydrophobic resins can be applied to the face side of the mat. For example, in some embodiments, the coating can be an elastomeric membrane, e.g., ExoAir coatings (such as ExoAir 230 or 430), from Tremco, Beachwood, Ohio, or cement/polymer coatings, e.g., as described in U.S. Pat. No. 7,347,895 B2, or U.S. Pat. Pub. No. 2014/0272402 A1, or U.S. 2014/0261954 A1.

The mat can be prepared in any suitable manner. For example, in a multi-layer design separate layer components can be prepared individually using known techniques including two layer wet felting or the like. The layers can then be bonded to each other along the horizontal surfaces thereof using known techniques including with adhesive, mechanical and/or heat pressing or the like. In some embodiments, the lower density first region is formed, and the higher density second region bonded on top thereof. In some embodiments, a gradient can be formed during wet felt mat formation through process manipulations including vacuum pressure or stock delivery. A coating is applied to the outer surface of the mat in a secondary step.

Composite gypsum board according to embodiments of the disclosure can be made on typical gypsum wallboard manufacturing lines. For example, board manufacturing techniques are described in, for example, U.S. Patent Pub. Nos. 2009/0029141 and 2010/0143682. Briefly, the process typically involves discharging a face mat onto a moving conveyor. Since gypsum board is normally formed "face down," this mat is the "face" mat in such embodiments.

In accordance with aspects of the disclosure, stucco slurry (also called gypsum slurry) is formed. The stucco slurry is used to form the board core. The slurry contains water, stucco, and other additives as desired. Foaming agent (or other lightweight material) can be included in the core slurry to provide a lower density. Other additives can be included as desired, including, for example, starch for enhancing the strength of the board (e.g., non-migrating starches such as pregelatinized starch, ethoxylated starches, etc), dispersant (e.g., naphthalene sulfonate), polyphosphate (e.g., sodium trimetaphosphate), accelerator (e.g., heat resistant accelerator), retarder, water resistance additive (e.g., siloxane), fire resistance additive (e.g., vermiculite, ATH), etc. Accordingly, the wet and dry feed lines to the respective mixers can be adjusted accordingly, which is well within the level of ordinary skill.

The slurry can be formed in any suitable manner. The "main" mixer (i.e., for forming the board core slurry) comprises a main body and a discharge conduit (e.g., a gate-canister-boot arrangement as known in the art, or a modified outlet design (MOD) arrangement as described in U.S. Pat. Nos. 6,494,609 and 6,874,930). Foaming agent can be added in the discharge conduit of the mixer (e.g., in the gate as described, for example, in U.S. Pat. Nos. 5,683,635 and 6,494,609) or in the main mixer.

In some embodiments, a dense layer can be applied in between the core and the face mat, and optionally between the core and the back mat. For example, stucco and water are inserted into the main mixer, while foam is inserted downstream in the discharge conduit, meaning that foam is not inserted in the main mixer body. The main mixer can be a pin mixer or a pin-less mixer, as desired. A portion of the slurry, which is essentially foamless, is diverted from the mixer from an exit port generally opposite the discharge conduit to form the concentrated layer slurry. The main mixer acts as a pump to drive the unfoamed slurry out the smaller discharge port for the dense slurry which flows through the pressurized slurry line. Additives in wet form are injected into the pressurized slurry line through injection ports. The line is desirably long enough, which is within the level of ordinary skill, to allow for uniform mixing of slurry and additives. There is no need for separate introduction of stucco or water. In some embodiments, two mixers can be used, with the second mixer for separately formulating a dense layer (skim coat), e.g., with less or no foam, to be deposited between the core and one or both mats.

In some embodiments, it will be understood that the discharge conduit can include a slurry distributor with either a single feed inlet or multiple feed inlets, such as those described in U.S. Patent Application Publication No. 2012/0168527 A1 (application Ser. No. 13/341,016) and U.S. Patent Application Publication No. 2012/0170403 A1 (application Ser. No. 13/341,209), for example. In those embodiments, using a slurry distributor with multiple feed inlets, the discharge conduit can include a suitable flow splitter, such as those described in U.S. Patent Application Publication No. 2012/0170403 A1.

Board is formed in a sandwich structure, normally concurrently and continuously, as will be understood in the art. The face mat travels on a conveyor. After being discharged from its mixer, the dense layer slurry (skim coat) can optionally be applied to the moving face cover sheet to form a continuous ribbon. Also, hard edges, as known in the art, can be formed, e.g., from the same slurry stream forming the concentrated layer for convenience, if desired.

The board core slurry is then applied over the moving face mat bearing the concentrated layer slurry, and covered with a second mat (typically the "back" mat) to form a wet assembly in the form of a sandwich structure that is a board precursor to the final product. It also is common in the manufacture of gypsum board to use vibration in order to eliminate large voids or air pockets from the deposited slurry. The back (top) mat may optionally bear a dense layer (skim coat). The wet assembly thereby provided is conveyed to a forming station where the product is sized to a desired thickness (e.g., via forming plate), and to one or more knife sections where it is cut to a desired length. The wet assembly is allowed to harden to form the interlocking crystalline matrix of set gypsum, and excess water is removed using a drying process (e.g., by transporting the assembly through a kiln).

The invention is further illustrated by the following examples of embodiments. However, the invention is not limited by the following embodiments.

(1) A mat for use as a cover sheet with gypsum or cement board, as described herein.

(2) A mat for gypsum board, the mat comprising: (a) an outer surface and an inner surface; (b) a first region adjacent to the outer surface defined along a horizontal plane of the mat, the first region having a first thickness, and a second region adjacent to the inner surface defined along a horizontal plane of the mat, the second region having a second thickness; wherein: (i) the first region is more hydrophilic than the second region.

(3) A mat for gypsum board, the mat comprising: (a) an outer surface and an inner surface; (b) a first region adjacent to the outer surface defined along a horizontal plane of the mat, the first region having a first thickness, and a second region adjacent to the inner surface defined along a horizontal plane of the mat, the second region having a second thickness; wherein: (i) the first region is more wettable than the second region.

(4) A mat for gypsum board, the mat comprising: (a) an outer surface and an inner surface; (b) a first region adjacent to the outer surface defined along a horizontal plane of the mat, the first region having a first thickness, and a second region adjacent to the inner surface defined along a horizontal plane of the mat, the second region having a second thickness; wherein: (i) the first region is less dense than the second region.

(5) The mat of any one of embodiments (1)-(4), wherein the mat contains multi-layers.

(6) The mat of embodiment (5), wherein the mat is a bi-layer with one layer containing the first region and another layer containing the second region.

(7) The mat of embodiment (5), wherein the mat is a tri-layer containing the first region in a first layer, the second region in a second layer, and a transition zone in a third layer.

(8) The mat of any one of embodiments (1)-(4), wherein the mat includes a gradient.

(9) The mat of embodiment (8), wherein the mat contains a single layer.

(10) The mat of embodiment (8), wherein the gradient results in increased density in the second region as compared with the first region.

(11) The mat of embodiment (8), wherein the gradient results in increased wettability in the first region as compared with the second region.

(12) The mat of embodiment (8), wherein the gradient results in increased hydrophilicity in the first region as compared with the second region.

(13) The mat of any one of embodiments (1)-(12), wherein the first thickness and the second thickness are the same.

(14) The mat of any one of embodiments (1)-(12), wherein the first region comprises from about 20% to about 80% of the total thickness of the mat.

(15) The mat of any one of embodiments (1)-(14), wherein the second region comprises from about 20% to about 80% of the total thickness of the mat.

(16) The mat of any one of embodiments (1)-(15), wherein the mat contains glass fibers.

(17) The mat of any one of embodiments (1)-(16), wherein the mat contains a fibrous thermoplastic or thermoset material.

(18) The mat of any one of embodiments (1)-(17), further comprising a coating applied to the outer surface of the mat.

(19) The mat of embodiment (18), wherein the mat has a total thickness, and coating when dried penetrates about 80% or less of the total mat thickness.

(20) The mat of embodiment (18), wherein the mat has a total thickness, and the coating when dried penetrates from about 20% to about 80% of the total mat thickness.

(21) The mat of embodiment (18), wherein the mat has a total thickness, and the coating when dried penetrates from about 20% to about 50% of the total mat thickness.

(22) The mat of any one embodiments (1)-(21), wherein the first region contains a binder that contributes hydrophilicity to the first region.

(23) The mat of any one of embodiments (1)-(22), wherein the second region contains a binder that contributes hydrophobicity to the second region.

(24) The mat of any one of embodiments (1)-(23), wherein the first region a lower contact angle when contacted with a coating than the second region upon contact with the same coating.

(25) The mat of embodiment (24), wherein the first region exhibits a contact angle of about 60° or less when contacted with a coating material, and the second region exhibits a contact angle of about 60° or greater when contacted with the same coating material, and wherein the first region exhibits a lower contact angle than the second region.

(26) A gypsum board comprising: (a) a gypsum core disposed between two cover sheets; (b) the gypsum core comprising a crystalline matrix of set gypsum, the core having a face surface and a back surface; (c) one or both cover sheets being in the form of a mat; (d) a first mat having an outer surface and an inner surface, the first mat facing the face surface of the core, the first mat comprising a first region adjacent to the outer surface defined along a horizontal plane of the mat, the first region having a first thickness, and a second region adjacent to the inner surface defined along a horizontal plane of the mat, the second region having a second thickness, and optionally a second mat having an outer surface and an inner surface, the second mat facing the back surface of the core, the second mat comprising a third region adjacent to the outer surface of the second mat defined along a horizontal plane of the mat, the third region having a third thickness, and a fourth region adjacent to the inner surface defined along a horizontal plane of the mat, the fourth region having a fourth thickness; wherein: (i) the first region is more hydrophilic than the second region, and, (ii) optionally the third region is more hydrophilic than the fourth region.

(27) A gypsum board comprising: (a) a gypsum core disposed between two cover sheets; (b) the gypsum core comprising a crystalline matrix of set gypsum, the core having a face surface and a back surface; (c) one or both cover sheets being in the form of a mat; (d) a first mat having an outer surface and an inner surface, the first mat facing the face surface of the core, the first mat comprising a first region adjacent to the outer surface defined along a horizontal plane of the mat, the first region having a first thickness, and a second region adjacent to the inner surface defined along a horizontal plane of the mat, the second region having a second thickness, and optionally a second mat having an outer surface and an inner surface, the second mat facing the back surface of the core, the second mat comprising a third region adjacent to the outer surface of the second mat defined along a horizontal plane of the mat, the third region having a third thickness, and a fourth region adjacent to the inner surface defined along a horizontal plane of the mat, the fourth region having a fourth thickness; wherein: (i) the first region is more wettable than the second region, and (ii) optionally the third region is more hydrophilic than the fourth region.

(28) A gypsum board comprising: (a) a gypsum core disposed between two cover sheets; (b) the gypsum core comprising a crystalline matrix of set gypsum, the core having a face surface and a back surface; (c) one or both cover sheets being in the form of a mat; (d) a first mat having an outer surface and an inner surface, the first mat facing the face surface of the core, the first mat comprising a first region adjacent to the outer surface defined along a horizontal plane of the mat, the first region having a first thickness, and a second region adjacent to the inner surface defined along a horizontal plane of the mat, the second region having a second thickness, and optionally a second mat having an outer surface and an inner surface, the second mat facing the back surface of the core, the second mat comprising a third region adjacent to the outer surface of the second mat defined along a horizontal plane of the mat, the third region having a third thickness, and a fourth region adjacent to the inner surface defined along a horizontal plane of the mat, the fourth region having a fourth thickness; wherein: (i) the first region is less dense than the second region (ii) optionally the third region is more hydrophilic than the fourth region.

(29) The gypsum board of any one of embodiments (26)-(28), wherein both cover sheets are in the form of a mat.

(30) The gypsum board of any one of embodiments (26)-(28), wherein each mat contains glass fibers.

(31) The gypsum board of any one of embodiments (26)-(28), wherein each mat contains thermoplastic or thermoset fibers.

(32) The gypsum board of any of embodiments (26)-(29), wherein each mat contains a coating applied to the outer surface.

(33) The gypsum board of any one of embodiments (26)-(30), wherein the mat contains multi-layers.

(34) The gypsum board of embodiment (33), wherein the mat is a bi-layer with one layer containing the first region and another layer containing the second region.

(35) The gypsum board of embodiment (33), wherein the mat is a tri-layer containing the first region in a first layer, the second region in a second layer, and a transition zone in a third layer.

(36) The gypsum board of any one of embodiments (26)-(35), wherein the mat includes a gradient.

(37) The gypsum board of embodiment (36), wherein the mat contains a single layer.

(38) The gypsum board of embodiment (36), wherein the gradient results in increased density in the second region as compared with the first region.

(39) The gypsum board of embodiment (36), wherein the gradient results in increased wettability in the first region as compared with the second region.

(40) The gypsum board of embodiment (36), wherein the gradient results in increased hydrophilicity in the first region as compared with the second region.

(41) The gypsum board of any one of embodiments (26)-(40), wherein the first thickness and the second thickness are the same.

(42) The gypsum board of any one of embodiments (26)-(41), wherein the first region comprises from about 20% to about 80% of the total thickness of the mat.

(43) The gypsum board of any one of embodiments (26)-(42), wherein the second region comprises from about 20% to about 80% of the total thickness of the mat.

(44) The gypsum board of embodiment (32), wherein the mat has a total thickness, and the coating when dried penetrates about 80% or less of the total mat thickness.

(45) The gypsum board of embodiment (32), wherein the mat has a total thickness, and the coating when dried penetrates from about 20% to about 80% of the total mat thickness.

(46) The gypsum board of embodiment (32), wherein the mat has a total thickness, and the coating when dried penetrates from about 20% to about 50% of the total mat thickness.

(47) The gypsum board of any one embodiments (26)-(46), wherein the first region contains a binder that contributes hydrophilicity to the first region.

(48) The gypsum board of any one of embodiments (26)-(47), wherein the second region contains a binder that contributes hydrophobicity to the second region.

(49) The gypsum board of any one of embodiments (26)-(48), wherein the first region a lower contact angle when contacted with a coating than the second region upon contact with the same coating.

(50) The gypsum board of embodiment (49), wherein the first region exhibits a contact angle of about 60° or less when contacted with a coating material, and the second region exhibits a contact angle of about 60° or greater when contacted with the same coating material, wherein the first region exhibits a lower contact angle than the second region.

(51) A method of preparing gypsum board, as described herein.

(52) A method of making composite gypsum board, the method comprising: (a) mixing at least water, stucco, and optionally one or more additives to form a slurry; (b) applying the slurry in a bonding relation to a face mat to form a board core, the board core having a face side and a back side, wherein the board core face side faces the face mat; (c) applying a back mat to the core slurry to form a board precursor; and (d) drying the board precursor to form the board; wherein: (i) at least one mat has an inner surface and an outer surface, and comprises a first region adjacent to the outer surface defined along a horizontal plane of the mat, the first region having a first thickness, and a second region adjacent to the inner surface defined along a horizontal plane of the mat, the second region having a second thickness; and (ii) the first region is more hydrophilic than the second region.

(53) A method of making composite gypsum board, the method comprising: (a) mixing at least water, stucco, and optionally one or more additives to form a slurry; (b) applying the slurry in a bonding relation to a face mat to form a board core, the board core having a face side and a back side, wherein the board core face side faces the face mat; (c) applying a back mat to the core slurry to form a board precursor; and (d) drying the board precursor to form the board; wherein: (i) at least one mat has an inner surface and an outer surface, and comprises a first region adjacent to the outer surface defined along a horizontal plane of the mat, the first region having a first thickness, and a second region adjacent to the inner surface defined along a horizontal plane of the mat, the second region having a second thickness; and (ii) the first region is more wettable than the second region.

(54) A method of making composite gypsum board, the method comprising: (a) mixing at least water, stucco, and optionally one or more additives to form a slurry; (b) applying the slurry in a bonding relation to a face mat to form a board core, the board core having a face side and a back side, wherein the board core face side faces the face mat; (c) applying a back mat to the core slurry to form a board precursor; and (d) drying the board precursor to form the board; wherein: (i) at least one mat has an inner surface and an outer surface, and comprises a first region adjacent to the outer surface defined along a horizontal plane of the mat, the first region having a first thickness, and a second region adjacent to the inner surface defined along a horizontal plane of the mat, the second region having a second thickness; and (ii) the first region is less dense than the second region.

(55) The method of any one of embodiments (51)-(54), wherein the mat contains multi-layers.

(56) The method of embodiment (55), wherein the mat is a bi-layer with one layer containing the first region and another layer containing the second region.

(57) The method of embodiment (55), wherein the mat is a tri-layer containing the first region in a first layer, the second region in a second layer, and a transition zone in a third layer.

(58) The method of any one of embodiments (51)-(54), wherein the mat includes a gradient.

(59) The method of embodiment (58), wherein the mat contains a single layer.

(60) The method of embodiment (58), wherein the gradient results in increased density in the second region as compared with the first region.

(61) The method of embodiment (58), wherein the gradient results in increased wettability in the first region as compared with the second region.

(62) The method of embodiment (58), wherein the gradient results in increased hydrophilicity in the first region as compared with the second region.

(63) The method of any one of embodiments (51)-(62), wherein the first thickness and the second thickness are the same.

(64) The method of any one of embodiments (51)-(62), wherein the first region comprises from about 20% to about 80% of the total thickness of the mat.

(65) The method of any one of embodiments (51)-(64), wherein the second region comprises from about 20% to about 80% of the total thickness of the mat.

(66) The method of any one of embodiments (51)-(65), wherein the mat contains glass fibers.

(67) The method of any one of embodiments (51)-(66), wherein the mat contains a fibrous thermoplastic or thermoset material.

(68) The method of any one of embodiments (51)-(67), further comprising a coating applied to the outer surface of the mat.

(69) The method of embodiment (68), wherein the mat has a total thickness, and coating when dried penetrates about 80% or less of the total mat thickness.

(70) The method of embodiment (68), wherein the mat has a total thickness, and the coating when dried penetrates from about 20% to about 80% of the total mat thickness.

(71) The method of embodiment (68), wherein the mat has a total thickness, and the coating when dried penetrates from about 20% to about 50% of the total mat thickness.

(72) The method of any one embodiments (51)-(71), wherein the first region contains a binder that contributes hydrophilicity to the first region.

(73) The method of any one of embodiments (51)-(72), wherein the second region contains a binder that contributes hydrophobicity to the second region.

(74) The method of any one of embodiments (51)-(73), wherein the first region a lower contact angle when contacted with a coating than the second region upon contact with the same coating.

(75) The method of embodiment (74), wherein the first region exhibits a contact angle of about 60° or less when contacted with a coating material, and the second region exhibits a contact angle of about 60° or greater when contacted with the same coating material and wherein the first region exhibits a lower contact angle than the second region.

(76) A method of preparing a mat, as described herein.

(77) A method of preparing a mat for use as a cover sheet with board, the method comprising: (a) introducing fibers to wet felting processing or the like to form a mat having an outer surface and an inner surface, the mat having a first region adjacent to the outer surface defined along a horizontal plane of the mat, the first region having a first thickness, and a second region adjacent to the inner surface defined along a horizontal plane of the mat, the second region having a second thickness; wherein (i) the first region is more hydrophilic than the second region.

(78) A method of preparing a mat for use as a cover sheet with board, the method comprising: (a) introducing fibers to wet felting processing or the like to form a mat having an outer surface and an inner surface, the mat having a first region adjacent to the outer surface defined along a horizontal plane of the mat, the first region having a first thickness, and a second region adjacent to the inner surface defined along a horizontal plane of the mat, the second region having a second thickness; wherein (i) the first region is more wettable than the second region.

(79) A method of preparing a mat for use as a cover sheet with board, the method comprising: (a) introducing fibers to wet felting processing or the like to form a mat having an outer surface and an inner surface, the mat having a first region adjacent to the outer surface defined along a horizontal plane of the mat, the first region having a first thickness, and a second region adjacent to the inner surface defined along a horizontal plane of the mat, the second region having a second thickness; wherein (i) the first region is less dense than the second region.

(80) The method of embodiments (76)-(79), wherein the mat is a bi-layer with the first region forming one layer and the second region forming the second layer.

(81) The method of embodiment (80), wherein the layers can then be bonded to each other along the horizontal surfaces.

(82) The method of embodiment (81), wherein the bonding is via adhesive.

(83) The method of embodiment (81), wherein the bonding is via mechanical and/or heat pressing.

(84) The method of any one of embodiments (76)-(83), wherein the first region is formed first and the higher density second region bonded thereon.

(85) The method of embodiments (76)-(79), wherein the mat forms a gradient.

(86) The method of embodiment (85), wherein the gradient is formed via vacuum pressure.

(87) The method of embodiment (85), wherein the gradient is formed via stock delivery.

(88) The method of any of embodiments (76)-(88), wherein a coating is applied to the outer surface of the mat in a secondary step.

It shall be noted that the preceding are merely examples of embodiments. Other exemplary embodiments are apparent from the entirety of the description herein. It will also be understood by one of ordinary skill in the art that each of these embodiments may be used in various combinations with the other embodiments provided herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the disclosure (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A gypsum board comprising:
    (a) a gypsum core comprising a crystalline matrix of set gypsum, the core having a face surface and a back surface;
    (b) a first mat having an outer surface and an inner surface, the first mat facing the face surface of the core, the first mat comprising a first region adjacent to the outer surface defined along a horizontal plane of the mat, and a second region adjacent to the inner surface defined along a horizontal plane of the mat, wherein the first region is more hydrophilic than the second region; and optionally
    (c) a second mat having an outer surface and an inner surface, the second mat facing the back surface of the core, the second mat comprising a third region adjacent to the outer surface of the second mat defined along a horizontal plane of the mat, and a fourth region adjacent to the inner surface defined along a horizontal plane of the mat, wherein the third region is more hydrophilic than the fourth region;
    the first region exhibiting a lower contact angle when contacted with a coating material than the second region upon contact with the same coating material.

2. The gypsum board of claim 1, wherein the first region is more wettable than the second region.

3. The gypsum board of claim 2, wherein the first region is less dense than the second region.

4. The gypsum board of claim 1, wherein the first region is less dense than the second region.

5. The gypsum board of claim 2, wherein at least one mat contains a coating on the outer surface, the mat having a total thickness, and the coating when dried penetrates from about 20% to about 80% of the total mat thickness.

6. The gypsum board of claim 1, wherein at least one of the mats is a bi-layer with one layer containing the first region and another layer containing the second region.

7. The gypsum board of claim 1, wherein at least one of the mats is a tri-layer containing the first region in a first layer, the second region in a second layer, and a transition zone in a third layer.

8. The gypsum board of claim 1, wherein the second mat is present.

9. A gypsum board comprising:
    (a) a gypsum core comprising a crystalline matrix of set gypsum, the core having a face surface and a back surface;
    (b) a first mat having an outer surface and an inner surface, the first mat facing the face surface of the core, the first mat comprising a first region adjacent to the outer surface defined along a horizontal plane of the mat, and a second region adjacent to the inner surface defined along a horizontal plane of the mat, wherein the first region is more wettable than the second region; and optionally
    (c) a second mat having an outer surface and an inner surface, the second mat facing the back surface of the core, the second mat comprising a third region adjacent to the outer surface of the second mat defined along a horizontal plane of the mat, and a fourth region adjacent to the inner surface defined along a horizontal plane of the mat, wherein the third region is more wettable than the fourth region;
    the first region exhibiting a contact angle of about 60° or less when contacted with a coating material, and the second region exhibiting a contact angle of about 60° or greater when contacted with the same coating material, the first region exhibiting a lower contact angle than the second region.

10. The gypsum board of claim 9, wherein the first region is less dense than the second region.

11. The gypsum board of claim 9, wherein at least one mat contains a coating on the outer surface, the mat having a total thickness, and the coating when dried penetrates from about 20% to about 80% of the total mat thickness.

12. The gypsum board of claim 9, wherein at least one of the mats is a bi-layer with one layer containing the first region and another layer containing the second region.

13. The gypsum board of claim 9, wherein at least one of the mats is a tri-layer containing the first region in a first layer, the second region in a second layer, and a transition zone in a third layer.

14. The gypsum board of claim 9, wherein the second mat is present.

15. A gypsum board comprising:
    (a) a gypsum core comprising a crystalline matrix of set gypsum, the core having a face surface and a back surface;
    (b) a first mat having an outer surface and an inner surface, the first mat facing the face surface of the core, the first mat comprising a first region adjacent to the outer surface defined along a horizontal plane of the mat, and a second region adjacent to the inner surface defined along a horizontal plane of the mat, wherein the first region is less dense than the second region, and optionally
    (c) a second mat having an outer surface and an inner surface, the second mat facing the back surface of the core, the second mat comprising a third region adjacent to the outer surface of the second mat defined along a horizontal plane of the mat, and a fourth region adjacent to the inner surface defined along a horizontal plane of the mat, wherein the third region is less dense than the fourth region;
    the first region of at least one of the mats exhibiting a lower contact angle when contacted with a coating material than the second region upon contact with the same coating material.

16. The gypsum board of claim 15, wherein at least one of the mats contains a coating applied to the outer surface.

17. The gypsum board of claim 16, wherein at least one of the mats has a total thickness, and the coating when dried penetrates from about 20% to about 80% of the total mat thickness.

18. The gypsum board of claim 15, wherein at least one of the mats is a bi-layer with one layer containing the first region and another layer containing the second region.

19. The gypsum board of claim 15, wherein at least one of the mats is a tri-layer containing the first region in a first layer, the second region in a second layer, and a transition zone in a third layer.

20. The gypsum board of claim 15, wherein the second mat is present.

* * * * *